US012062323B2

(12) United States Patent
Xiong et al.

(10) Patent No.: US 12,062,323 B2
(45) Date of Patent: Aug. 13, 2024

(54) DRIVING METHOD OF DISPLAY DEVICE, DISPLAY DEVICE, AND COMPUTER READABLE STORAGE MEDIUM

(71) Applicants: CHONGQING HKC OPTOELECTRONICS TECHNOLOGY CO., LTD., Chongqing (CN); HKC CORPORATION LIMITED, Shenzhen (CN)

(72) Inventors: Zhi Xiong, Chongqing (CN); Haoxuan Zheng, Chongqing (CN)

(73) Assignees: CHONGQING HKC OPTOELECTRONICS TECHNOLOGY CO., LTD., Chongqing (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/902,265

(22) Filed: Sep. 2, 2022

(65) Prior Publication Data

US 2022/0415248 A1 Dec. 29, 2022

Related U.S. Application Data

(63) Continuation of application No. PCT/CN2021/142618, filed on Dec. 29, 2021.

(30) Foreign Application Priority Data

Jan. 27, 2021 (CN) ......................... 202110114329.0

(51) Int. Cl.
*G09G 3/32* (2016.01)
*G09G 3/3208* (2016.01)
(Continued)

(52) U.S. Cl.
CPC ............. *G09G 3/32* (2013.01); *G09G 3/3208* (2013.01); *G09G 3/3406* (2013.01); *G09G 5/008* (2013.01);
(Continued)

(58) Field of Classification Search
CPC .......... G09G 3/20; G09G 3/32; G09G 3/3208; G09G 3/3406; G09G 2300/0842;
(Continued)

(56) References Cited

U.S. PATENT DOCUMENTS 11,158,266 B2 * 10/2021 Baek .................... G09G 3/3233
2002/0154151 A1 10/2002 Koyama
(Continued)

FOREIGN PATENT DOCUMENTS

CN 101046941 A 10/2007
CN 101169919 A 4/2008
(Continued)

OTHER PUBLICATIONS

First Office Action issued in counterpart Chinese Patent Application No. 202110114329.0, dated May 27, 2022.
(Continued)

*Primary Examiner* — Jason M Mandeville
(74) *Attorney, Agent, or Firm* — Westbridge IP LLC

(57) ABSTRACT

Disclosed is a driving method of a drive device, applied on a drive device. The method includes: receiving, by the first control chip, target display data, and processing, by the first control chip, the target display data to obtain a conversion clock signal, a frame synchronization signal and a pre-processed display signal; obtaining, by the second control chip, a result clock signal based on the conversion clock signal and the frame synchronization signal, a period of the result clock signal and a period of the frame synchronization signal meet a preset condition; obtaining, by the second
(Continued)

control chip, a result display signal based on the pre-processed display signal; and lighting, by the third control chip, the light emitting component based on the result clock signal and the result display signal. The present application also discloses a display device and a computer readable storage medium.

10 Claims, 2 Drawing Sheets

(51) Int. Cl.

| | |
|---|---|
| ***G09G 3/34*** | (2006.01) |
| ***G09G 5/00*** | (2006.01) |
| *G09G 3/20* | (2006.01) |

(52) U.S. Cl.
CPC ....... *G09G 3/20* (2013.01); *G09G 2300/0842* (2013.01); *G09G 2320/0247* (2013.01); *G09G 2320/062* (2013.01)

(58) Field of Classification Search
CPC ..... G09G 2320/0247; G09G 2320/062; G09G 5/008; G09G 2310/08
USPC ............................................................ 345/55
See application file for complete search history.

(56) References Cited

U.S. PATENT DOCUMENTS

| | | | | |
|---|---|---|---|---|
| 2005/0057551 | A1* | 3/2005 | Gong | H04N 5/0736 348/E5.016 |
| 2006/0262054 | A1 | 11/2006 | Yamazaki et al. | |
| 2006/0262809 | A1 | 11/2006 | Gong et al. | |
| 2011/0249033 | A1* | 10/2011 | Oh | G09G 3/3648 345/690 |
| 2012/0169698 | A1* | 7/2012 | Park | G09G 3/20 345/211 |
| 2013/0021386 | A1* | 1/2013 | Min | G09G 3/36 345/102 |
| 2015/0123963 | A1 | 5/2015 | Tsai et al. | |
| 2015/0243208 | A1 | 8/2015 | Kim et al. | |
| 2017/0249906 | A1 | 8/2017 | Noh et al. | |
| 2018/0062692 | A1 | 3/2018 | Huh et al. | |

FOREIGN PATENT DOCUMENTS

| | | | |
|---|---|---|---|
| CN | 102119407 | A | 7/2011 |
| CN | 102890917 | A | 1/2013 |
| CN | 103295551 | A | 9/2013 |
| CN | 107154243 | A | 9/2017 |
| CN | 109192149 | A | 1/2019 |
| CN | 109256098 | A | 1/2019 |
| CN | 109584773 | A | 4/2019 |
| CN | 110136654 | A | 8/2019 |
| CN | 110634439 | A | 12/2019 |
| CN | 111818284 | A | 10/2020 |
| CN | 112863419 | A | 5/2021 |
| JP | H0990906 | A | 4/1997 |
| JP | 2005037899 | A | 2/2005 |
| JP | 2013205574 | A | 10/2013 |
| JP | 2014026006 | A | 2/2014 |
| KR | 20190010822 | A | 1/2019 |
| TW | 201519208 | A | 5/2015 |

OTHER PUBLICATIONS

International Search Report and Written Opinion issued in corresponding PCT Application No. PCT/CN2021/142618, dated Mar. 18, 2022.
The Grant Notice issued in counterpart Chinese Patent Application No. 202110114329.0, dated Nov. 2, 2022.
First Office Action issued in counterpart Japanese Patent Application No. 2022-544230, dated Jun. 12, 2023.
Request for the Submission of an Opinion issued in counterpart Korean Patent Application No. KR 10-2022-7025135, dated Feb. 13, 2024.
European Search Report issued in counterpart European Patent Application No. EP 21922682.6, dated Jun. 5, 2024.
Written Decision on Registration issued in counterpart Korean Patent Application No. KR 10-2022-7025135, dated Jun. 4, 2024.

* cited by examiner

DRIVING METHOD OF DISPLAY DEVICE, DISPLAY DEVICE, AND COMPUTER READABLE STORAGE MEDIUM

CROSS-REFERENCE TO RELATED APPLICATIONS

The present application is a continuation of International Application No. PCT/CN2021/142618, filed on Dec. 29, 2021, which claims priority to Chinese Patent Application No. 202110114329.0, titled "Driving Method of Display Device, Display Device, and Computer Readable Storage Medium" and filed on Jan. 27, 2021. The disclosures of the aforementioned applications are hereby incorporated for reference in their entireties for all purposes.

TECHNICAL FIELD

The present application relates to the technical field of display technology, and in particular to a driving method of a display device, a display device, and a computer-readable storage medium.

BACKGROUND

As requirements on the picture quality of display devices become higher and higher, the traditional backlight partition dimming technology or lower partition dimming technology cannot meet the requirements. Thus in the related art, a new backlight display technology is proposed based on the mini LED (LED of the order of 100 μm, LED is the light-emitting diode) and the Micro LED (miniaturized and matrix light-emitting diode). Since the new backlight display technology has dimming close to pixel-level, and makes the pixels of low gray levels have a very low brightness, and the pixels of high gray levels have a very high brightness, which results that the brightness display effect of the display device is excellent.

However, when the existing driving method of the display device is used to control the display device, the display effect of the display device is poor.

SUMMARY

The main purpose of the present application is to provide a driving method of a display device, a display device and a computer readable storage medium, aiming to solve a technical problem that when the driving method of the existing display device is used to control the display device, the display effect of the display device is poor.

In order to achieve the above purpose, the present application proposes a driving method of a display device, applied to a display device comprising a first control chip, a second control chip, a third control chip and a light emitting component, the method including:

receiving, by the first control chip, target display data, and processing, by the first control chip, the target display data to obtain a conversion clock signal, a frame synchronization signal and a pre-processed display signal;

obtaining, by the second control chip, a result clock signal based on the conversion clock signal and the frame synchronization signal, wherein a period of the result clock signal and a period of the frame synchronization signal meet a preset condition;

obtaining, by the second control chip, a result display signal based on the pre-processed display signal; and lighting, by the third control chip, the light emitting component based on the result clock signal and the result display signal.

In one embodiment, the obtaining, by the second control chip, the result clock signal based on the conversion clock signal and the frame synchronization signal, includes, obtaining, by the second control chip, a preset clock signal based on the frame synchronization signal; and obtaining, by the second control chip, the result clock signal based on the preset clock signal and the conversion clock signal.

In one embodiment, the preset clock signal comprises a plurality of sub-preset clock signals with the same period and the conversion clock signal comprises a plurality of sub-conversion clock signals with the same period; the obtaining, by the second control chip, the result clock signal based on the preset clock signal and the conversion clock signal includes, obtaining, by the second control chip, an adjustment period based on the periods of the sub-conversion clock signals; and obtaining, by the second control chip, the result clock signal by replacing the periods of the sub-preset clock signals with the adjustment period.

In one embodiment, the obtaining, by the second control chip, the adjustment period based on the period of the sub-conversion clock signal includes, obtaining, by the second control chip, the adjustment period based on the periods of the sub-conversion clock signals and a preset parameter of the second control chip.

In one embodiment, the preset parameter comprises a preset multiplication frequency of the second control chip and a preset division frequency of the second control chip; the obtaining, by the second control chip, the adjustment period based on the period of the sub-conversion clock signal and the preset parameters of the second control chip includes, obtaining, by the second control chip, the adjustment period based on the periods of the sub-conversion clock signals, the preset multiplication frequency and the preset division frequency.

In one embodiment, the obtaining, by the second control chip, the adjustment period based on the periods of the sub-conversion clock signals, the preset multiplication frequency and the preset division frequency includes, obtaining, by the second control chip according to a formula I, the adjustment period based on the periods of the sub-conversion clock signals, the preset multiplication frequency and the preset division frequency;

wherein the formula I is:

$$T_{GCLK} = T_{CPV} \times \frac{A}{B}$$

wherein $T_{GCLK}$ is the adjustment period, $T_{CPV}$ is the periods of the sub-conversion clock signals, A is the preset multiplication frequency and B is the preset division frequency.

In one embodiment, the first control chip is a logic board, the second control chip is a microcontroller, and the third control chip is a driver chip for driving light emitting diodes.

In one embodiment, the light emitting component is a light emitting diode.

In one embodiment, the result clock signal comprises a plurality of sub-result clock signals with equal periods, and the period of the result clock signal is a sum of the periods of the plurality of sub-result clock signals.

In one embodiment, the preset condition is that a ratio of the period of the result clock signal to the period of the frame synchronization signal is within a preset interval, and the period of the result clock signal is not greater than the period of the frame synchronization signal.

In one embodiment, the ratio of the period of the result clock signal to the period of the frame synchronization signal is greater than 0.7 and less than 1.

In one embodiment, the first control chip receives the target display data from a system control chip, the target display data is processed by the first control chip to obtain the conversion clock signal, the frame synchronization signal and the pre-processed display signal.

In one embodiment, the conversion clock signal comprises a plurality of sub-conversion clock signals with equal periods, wherein the period of the conversion clock signal is a sum of the periods of the plurality of the sub-conversion clock signals.

In addition, in order to achieve above purpose, the present application also provides a display device, including: a memory, a processor and a driving program of the display device stored on the memory and operated on the processor, when the driving program of the display device is executed by the processor, the driving method of the display device according to any one of above embodiments is realized.

In addition, in order to achieve above purpose, the present application also provides computer readable storage medium storing a driving program of a display device, when the driving program of the display device is executed by a processor, the driving method of the display device according to any one of above embodiments is realized.

The technical solution of the present application proposes a driving method of the display device applied to a display device, the display device includes a first control chip, a second control chip, a third control chip and a light emitting component. The method includes: receiving, by the first control chip, target display data, and processing, by the first control chip, the target display data to obtain a conversion clock signal, a frame synchronization signal and a pre-processed display signal; obtaining, by the second control chip, a result clock signal based on the conversion clock signal and the frame synchronization signal, wherein a period of the result clock signal and a period of the frame synchronization signal meet a preset condition; obtaining, by the second control chip, a result display signal based on the pre-processed display signal; and lighting, by the third control chip, the light emitting component based on the result clock signal and the result display signal. In the existing driving method of the display device, the second control chip obtains the preset clock signal through the frame synchronization signal, and the period of the preset clock signal is a fixed value, while the period of the frame synchronization signal is a variable value, resulting in that the period of the preset clock signal and the period of the frame synchronization signal do not meet the preset conditions. When the third control chip lights the light emitting component based on the preset clock signal and the result display signal, the light emitting component is unstable, so that the display picture flickers and the display effect of the display device is poor. In the present application, the second control chip obtains the result clock signal based on the conversion clock signal and frame synchronization signal of the first control chip, and the period of the result clock signal and that the frame synchronization signal meet the preset condition. When the third control chip lights the light emitting component based on the result clock signal and the result display signal, the light emitting component emits stable light, so that the display picture does not flicker and the display effect of the display device is better. Therefore, the technical problem of poor display effect of the display device is solved by using the driving method of the display device of the present application.

BRIEF DESCRIPTION OF THE DRAWINGS

In order to more clearly explain the embodiments of the present application or the technical solutions in the related art, the following will briefly introduce drawings in the embodiments or in the description of the related art. It is obvious that the drawings described below are only some embodiments of the present application. For those skilled in the art, other drawings can be obtained according to the structure shown in these drawings without paying creative labor.

The realization of the purpose, functional features and advantages of the present application will be further described in conjunction with the embodiments, with reference to the accompanying drawings.

DETAILED DESCRIPTION OF THE EMBODIMENTS

The technical solutions in the embodiments of the present application will be clearly and completely described below in conjunction with the accompanying drawings in the embodiments of the present application. Obviously, the described embodiments are only some of the embodiments of the present application, and not all of embodiments of the present application. Based on the embodiments in the present application, all other embodiments obtained by those skilled in the art without making creative labor are within the claimed scope of the present application.

Figure 1:
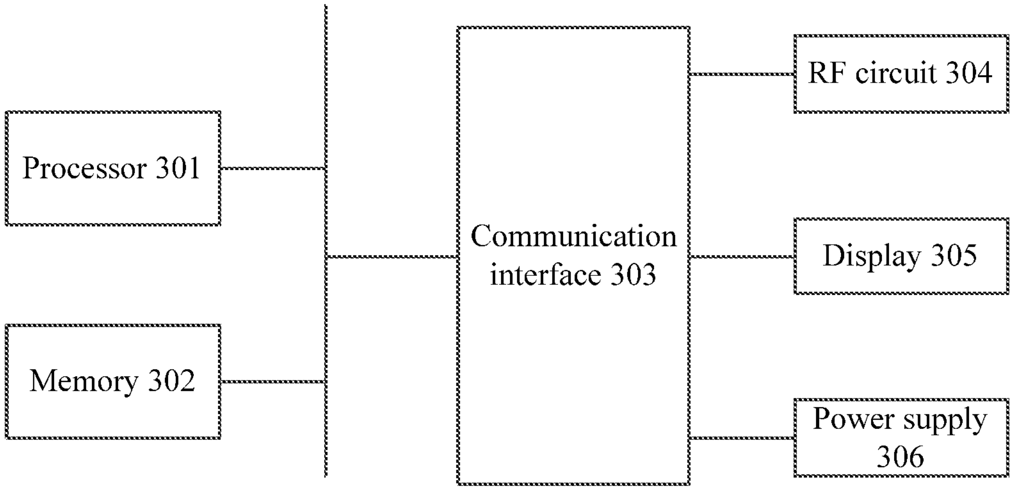
FIG. 1 is a schematic structural diagram of a display device of a hardware operating environment related to an embodiment of the present application.

Referring to FIG. 1, FIG. 1 is a structural schematic diagram of a display device of a hardware operating environment related to an embodiment of the present application.

The display device may be a cell phone, a smart phone or a laptop computer, or the like.

Typically, the display device includes: at least one processor 301, a memory 302, and a driving program of the display device which is stored on the memory and operated on the processor, the driving program of the display device is configured to realize a driving method of the display device as mentioned above.

The processor 301 may include one or more processing cores, such as a 4-core processor, an 8-core processor, etc. The processor 301 may be realized by at least one of hardware such as a Digital Signal Processing (DSP), a Field-Programmable Gate Array (FPGA), a Programmable Logic Array (PLA). The processor 301 may also include a main processor and an auxiliary processor. The main processor is for processing data when the display device is in the wakeup state, and is also called as a Central Processing Unit (CPU). The auxiliary processor is a low-power processor for processing data when the display device is in the standby state. In some embodiments, a Graphics Processing Unit (GPU) can be integrated on the processor 301, and is used to render and draw the content to be displayed by the display. The processor 301 may also include an artificial intelligence (AI) processor for processing operations related to the driving method of the display device, to allow a model related to the driving method of the display device to be autonomously trained and the efficiency and accuracy can be improved.

The memory 302 may include one or more computer readable storage medium, which may be non-transitory. The memory 302 may also include a high-speed random access memory, and a non-volatile memory, such as one or more disk storage devices, and flash memory storage devices. In some embodiments, the non-transitory computer readable storage medium in the memory 302 is used to store at least one instruction, which is executed by the processor 301 to realize the driving method of the display device provided by the embodiments in the present application.

In some embodiments, the terminal also includes a communication interface 303 and at least one peripheral device. The processor 301, the memory 302, and the communication interface 303 may be connected to each other via a bus or a signal line. Each peripheral device may be connected to the communication interface 303 via a bus, a signal line, or a circuit board. In one embodiment, the peripheral devices include at least one of: an RF circuit 304, a display 305, and a power supply 306.

The communication interface 303 may be used to connect at least one peripheral device related to input/output to the processor 301 and the memory 302. In some embodiments, the processor 301, the memory 302, and the communication interface 303 are integrated on the same chip or on the same circuit board. In some other embodiments, any one or two of the processor 301, the memory 302 and the communication interface 303 may be implemented on a separate chip or board, which is not limited on this embodiment.

The radio frequency (RF) circuit 304 is used to receive and transmit radio frequency signals which are also called as electromagnetic signals. The RF circuit 304 communicates with communication networks and other communication devices via the electromagnetic signals. The RF circuit 304 converts electrical signals to electromagnetic signals for transmission, or converts received electromagnetic signals to electrical signals. In one embodiment, the RF circuit 304 includes an antenna system, an RF transceiver, one or more amplifiers, a tuner, an oscillator, a digital signal processor, a codec chipset, a user identity module, and so on. The RF circuit 304 may communicate with other terminals via at least one wireless communication protocol. The wireless communication protocols include, but are not limited to, metropolitan area networks, various generations of mobile communication networks (2G, 3G, 4G, and 5G), wireless local area networks, and/or wireless fidelity (WiFi) networks. In some embodiments, the RF circuit 304 may also include circuits related to Near Field Communication (NFC), which is not limited by the present application.

The display 305 is used to display a user interface (UI). The UI may include graphics, text, icons, video, and any combination thereof. When the display 305 is a touch display, the display 305 also can capture a touch signal on or above the surface of the display 305. The touch signal can be as a control signal input to the processor 301 for processing. The display 305 may also provide virtual buttons and/or a virtual keyboard, also referred as soft buttons and/or a soft keyboard. In some embodiments, the display 305 can be a front panel of the electronic device. In other embodiments, there are at least two displays 305 provided on a different surface of the electronic device or in a folded design. In still other embodiments, the display 305 can be a flexible display provided on a curved surface or on a folded surface of the electronic device. The display 305 can even have a non-rectangular irregular shape, that is, a special shaped screen. The display 305 can be made of materials such as Liquid Crystal Display (LCD), and Organic Light-Emitting Diode (OLED).

The power supply 306 is used to power the various components of the electronic device. The power supply 306 can be alternating current (AC), direct current (DC), disposable batteries or rechargeable batteries. When the power supply 306 includes a rechargeable battery, the rechargeable battery can support wired charging or wireless charging. The rechargeable battery may also support fast charging. It will be understood by those skilled in the art that the structure illustrated in FIG. 1 does not limit the display device, which may include more or fewer components than illustrated, or a combination of certain components, or a different arrangement of components.

In addition, the embodiments of the present application also present a computer readable storage medium, on which a driving program of the display device is stored. When the driving program of the display device is executed by a processor, the operations of the driving method of the display device as described above are realized. Accordingly, the same will not be described herein. In addition, the beneficial effects of the same method will not be repeated. For technical details not disclosed in the embodiments of the computer readable storage media involved in the present application, the description of the method embodiments of the present application can be referred to. As an example, the program instructions may be executed on a single display device, or on multiple display devices located at a single location, or on multiple display devices distributed at multiple locations and interconnected via a communication network.

Those skilled in the art can understand that all or part of the processes in the method of the above embodiments is possible by means of a computer program to instruct the relevant hardware, and that the above program can be stored in a computer readable storage medium, and that the program, when executed, can include the process in the above embodiments of each method. The above computer readable storage medium may be a disk, a CD, a Read-Only Memory (ROM) or a Random Access Memory (RAM), etc.

Based on the above hardware structure, an embodiment of a driving method of the display device of the present application is proposed.

Figure 2:
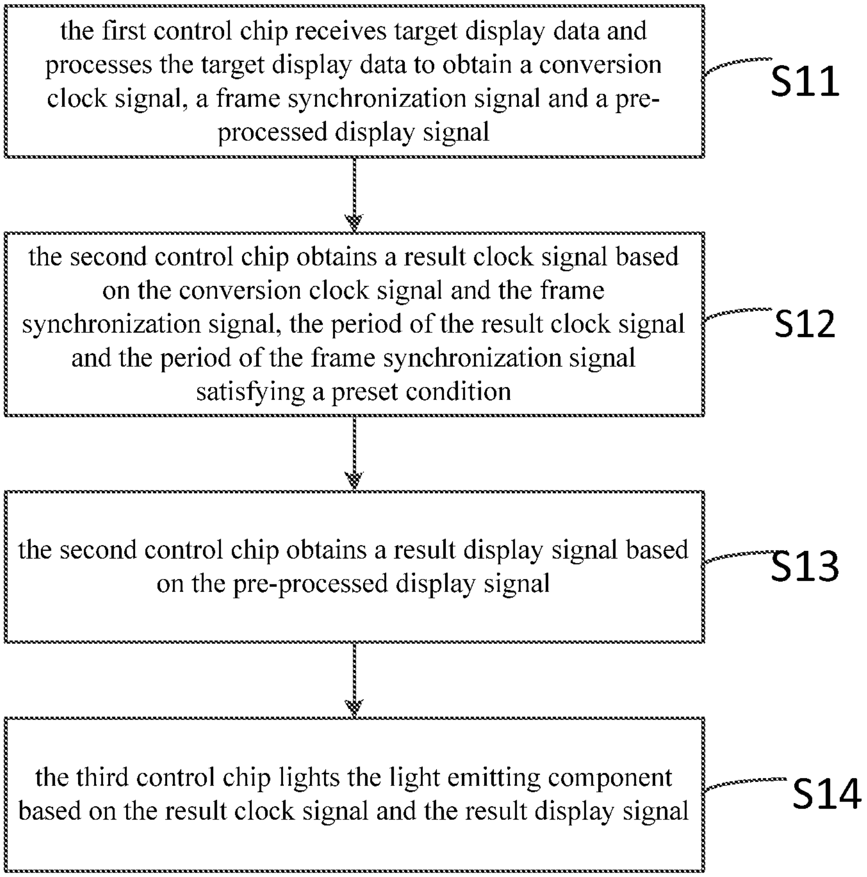
FIG. 2 is a flowchart of a first embodiment of a driving method of the display device according to the present application.

Referring to FIG. 2, FIG. 2 is a flowchart of a first embodiment of the driving method of the display device according to the present application. The method is applied to a display device and includes a first control chip, a second control chip, a third control chip and a light-emitting component. The method includes the following operations.

In operation S11, the first control chip receives target display data and processes the target display data to obtain a conversion clock signal, a frame synchronization signal and a pre-processed display signal.

It should be noted that the executive subject of the present application is the display device, and the display device is generally based on mini LED or Micro LED backlight technology. The display device is installed with a driving program of the display device. When the driving program of the display device is executed by the display device, operations of the driving method of the display device of the present application are realized.

In one embodiment, the first control chip is a logic board (TCON), the second control chip is a microcontroller (MCU), the third control chip is a driver chip for driving light emitting diodes, and the light emitting component is a light emitting diode (i.e., an LED). Typically, the first control chip receives target display data from a system control chip (e.g., SOC), and the target display data needs to be preliminarily processed by the first control chip to obtain a conversion clock signal (CPV signal), a frame synchronization signal (Vsync signal), and a pre-processed display signal (SPI data signal).

It can be understood that the target display data in the present application is transmitted in frames, i.e., the target display data are data of an image frame. Each time the system control chip sends the target display data of one image frame. The target display data of the image frame is processed by the first control chip. After that, the operation S11 will be repeated when target display data of a next image frame is received.

In addition, a frame period (a frame duration, that is, a period of the frame synchronization signal) of a target display data of each image frame is different from those of the target display data of the other image frames. The conversion clock signal (CPV signal) is obtained based on the frame duration. The period of the conversion clock signal corresponds to that of the frame synchronization signal.

Generally, the conversion clock signal includes a plurality of sub-conversion clock signals, the sub-conversion clock signals have the same period. The period of the conversion clock signal is a sum of the periods of the plurality of sub-conversion clock signals.

In operation S12, the second control chip obtains a result clock signal based on the conversion clock signal and the frame synchronization signal, the period of the result clock signal and the period of the frame synchronization signal satisfying a preset condition.

In operation S13, the second control chip obtains a result display signal based on the pre-processed display signal.

It should be noted that the result clock signal includes a plurality of sub-result clock signals, and the sub-result clock signals have the same period. The period of the result clock signal is a sum of periods of the plurality of sub-result clock signals. The preset condition is that a ratio of the period of the result clock signal to the period of the frame synchronization signal is within a preset interval, which makes the period of the result clock signal not greater than that of the frame synchronization signal, and a difference between the period of the result clock signal and that of the frame synchronization signal smaller. The preset interval can be determined by the user according to their requirements, which will not be limited in the present application. Typically, the ratio of the period of the result clock signal to that of the frame synchronization signal is greater than 0.7 and less than 1.

In addition, the pre-processed display signal cannot be used by the third control chip, and a format of the pre-processed display signal needs to be converted to obtain the result display signal, which can be used by the third control chip to light the light emitting component.

The result clock signal can also be used by the third control chip for controlling the lighting time of the light emitting component.

In one embodiment, operation S12 includes that the second control chip obtains a preset clock signal based on the frame synchronization signal, and obtains the result clock signal based on the preset clock signal and the conversion clock signal.

The preset clock signal includes a plurality of sub-preset clock signals with the same period and the conversion clock signal includes a plurality of sub-conversion clock signals with the same period. The operation of the second control chip obtaining the result clock signal based on the preset clock signal and the conversion clock signal includes: the second control chip obtaining an adjustment period based on the period of the sub-conversion clock signals; and obtaining the result clock signal by replacing the period of the sub-preset clock signals with the adjustment period.

It should be noted that the preset clock signal generally includes a fixed number of sub-preset clock signals, and the sub-preset clock signals in the preset clock signal has a preset period. The adjustment period of the sub-preset clock signals is determined based on the period of the sub-conversion clock signals in the conversion clock signal, and the preset period of the sub-preset clock signals is replaced with the adjustment period to obtain new sub-preset clock signals with the adjustment period. The new sub-preset clock signals is the sub-result clock signals mentioned above. The total of a plurality of sub-result clock signals form a clock signal. It should be understood that the number of sub-result clock signals of the result clock signal is the same as that of sub-preset clock signals of the preset clock signal, and the period of the sub-result clock signals (namely the adjustment period) is different from that of the sub-preset clock signals (namely the preset period).

Since the period of the sub-result clock signals is obtained based on the period of the sub-conversion clock signals, the period of the result clock signal corresponding to the sub-result clock signals has a correspondence with the period of the conversion clock signal corresponding to the sub-conversion clock signals, and the period of the conversion clock signal corresponds to the period of the frame synchronization signal. The period of the result clock signal also has a correspondence with the period of the frame synchronization signal, that is, the period of the result clock signal and the period of the frame synchronization signal meet the preset condition.

Further, the operation of the second control chip obtaining an adjustment period based on the period of the sub-conversion clock signals includes: the second control chip obtains the adjustment period based on the period of the sub-conversion clock signals and a preset parameter of the second control chip.

The preset parameter includes a preset multiplication frequency and a preset division frequency of the second control chip. The operation of the second control chip obtaining the adjustment period based on the period of the sub-conversion clock signals and a preset parameter of the second control chip includes: the second control chip obtaining the adjustment period based on the period of the sub-conversion clock signals, the preset multiplication frequency and the preset division frequency.

In an embodiment of the present application, the operation of the second control chip obtaining the adjustment period based on the period of the sub-conversion clock signals, the preset multiplication frequency and the preset division frequency, includes: the second control chip obtaining the adjustment period according to a formula I based on the period of the sub-conversion clock signal, the preset multiplication frequency and the preset division frequency.

The formula I is:

$$T_{GCLK} = T_{CPV} \times \frac{A}{B}$$

$T_{GCLK}$ is the adjustment period, $T_{CPV}$ is the period of the sub-conversion clock signals, A is the preset multiplication frequency and B is the preset division frequency.

It should be noted that the conversion clock signal generally includes M sub-conversion clock signals, M is a natural number and obtained based on the resolution of the display device. In addition, the preset clock signal includes N sub-preset clock signals, N is a preset natural number and unadjustable. In the present application, the period of the sub-preset clock signals of the preset clock signal is adjusted to obtain the result clock signal. The result clock signal includes N sub-result clock signals, and the sub-result clock signals are new sub-preset clock signals obtained by replacing the period (the preset period) of the sub-preset clock signals with the adjustment period.

In operation S14, the third control chip lights the light emitting component based on the result clock signal and the result display signal.

The third control chip lights the light emitting component based on the display signal to display a corresponding image and controls the lighting time of the light emitting component based on the result clock signal.

Figure 3:
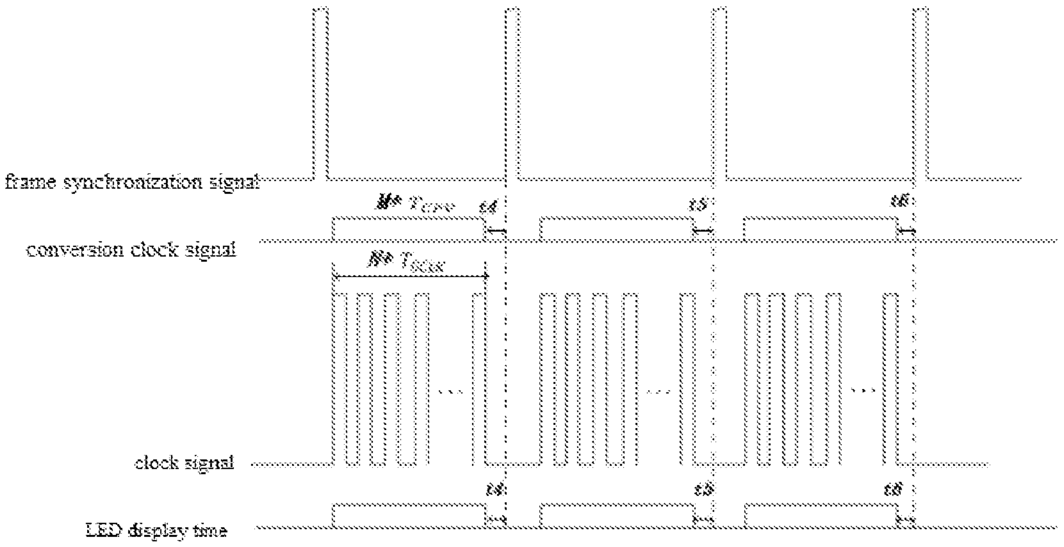
FIG. 3 is a schematic diagram of signals of the driving method of the display device according to the present application.

Referring to FIG. 3, FIG. 3 is a schematic diagram of signals of the driving method of the display device according to the present application.

In the existing driving method of the display device, the first control chip receives the target display data, and converts the target display data into pre-processed data signal and the frame synchronization signal. The second control chip converts the pre-processed data signal and the frame synchronization signal into the preset clock signal and the result display signal adapted to the third control chip. The third control chip lights the light emitting component (LED) based on the preset clock signal and the result display signal. The second control chip obtains the preset clock signal based on the frame synchronization signal. The preset clock signal includes N sub-preset clock signals, and the preset period of each of the sub-preset clock signals is $T_1$. The second control chip does not make any adjustment to $T_1$, and the preset clock signal (including N sub-preset clock signals of which the preset period is $T_1$) is directly used.

Usually, since signal sources or video contents of an image frame, which corresponds to the target display data sent by the system control chip, are different, the frame durations (the periods of the frame synchronization signals) of different image frames are different. Since the first control chip cannot predict the frame duration of the target display data sent by the system control chip, only the preset clock signal (including N sub-preset clock signals of which the period is $T_1$, and the period of the preset clock signal being $N^*T_1$) can be used. When the result display signals corresponding to different frame durations are received, the third control chip can only control the lighting time of the LED based on the preset clock signal.

When the period of the frame synchronization signal (i.e. frame duration) corresponds to that of the preset clock signal (the period is $N^*T_1$), the frame duration is suitable. After the period of the preset clock signal ends and the duration $t_1$ expires, the frame synchronization signal ends. The duration $t_1$ is relatively suitable and not too long or too short. When the frame duration of the frame synchronization signal is shorter, the situation that the next frame synchronization signal arrives, but the preset clock signal still stays and the period of which has still a long time to the end, will occur, which results in signal conflict and LED flickering. When the frame duration of the frame synchronization signal is longer, the frame synchronization signal ends after a time $t_3$ from the ending of the period of the preset clock signal. The display effect of the LED display is poor, and $t_3$ is longer.

Referring to FIG. 3, in the driving method of the display device of the present application, the first control chip receives the target display data, and converts the target display data into the conversion clock signal, the pre-processed data signal and the frame synchronization signal. The second control chip obtains the result clock signal adapted to the third control chip based on the frame synchronization signal and the conversion clock signal, and converts the pre-processed data signal into the result display signal adapted to the third control chip. The third control chip lights the LEDs based on the result clock signal and the result display signal.

The second control chip obtains the preset clock signal based on the frame synchronization signal. The preset clock signal includes N sub-preset clock signals. The preset period of each of the sub-preset clock signal is $T_1$. The second control chip uses the driving method of the display device of the present application to obtain the adjustment period $T_{GCLK}$ of the sub-preset clock signal, and replaces the period (the preset period) of the sub-preset clock signal with the adjustment period to obtain the sub-result clock signals, and obtains the result clock signal based on the sub-result clock signals (the result clock signal includes N sub-result clock signals, of which the period is $T_{GCLK}$, and the period of the result clock signal is $N^*T_{GCLK}$). The period of the result clock signal corresponds to the period of the conversion clock signal (the period of the conversion clock signal is $M^*T_{CPV}$), which makes the period of the result clock signal correspond to the period (frame duration) of the frame synchronization signal.

Referring to FIG. 3, after the result clock signal is ended and the durations $t_4$, $t_5$, $t_6$ expire in order, the frame synchronization signal is also ended. The durations $t_4$, $t_5$, $t_6$ are suitable and not too long or too short, and the LED lighting effect will not be affected. At this time, the situation that the frame synchronization signal is ended but the result clock signal is not ended will not occurs, and the situation that the frame synchronization signal is not ended after that the result clock signal has ended for a long time will also not occur.

The embodiment of the present application proposes a driving method of a display device. The display device includes a first control chip, a second control chip, a third control chip and a light emitting component. The driving method includes: receiving and processing, by a first control chip, target display data to obtain a conversion clock signal, a frame synchronization signal and a pre-processed display signal; obtaining, by a second control chip, a result clock signal based on the conversion clock signal and the frame synchronization signal, a period of the result clock signal and that of the frame synchronization signal meeting a preset condition; obtaining, by the second control chip, a result display signal based on the pre-processed display signal; and lighting, by a third control chip, a light emitting component based on the result clock signal and the result display signal. In the existing driving method of the display device, the second control chip obtains the preset clock signal through the frame synchronization signal. The period of the preset clock signal is fixed, while the period of the frame synchronization signal is variable, which results in that the period of the preset clock signal and the period of the frame synchronization signal do not meet the preset condition. When the third control chip lights the light emitting component based on the preset clock signal and the result display signal, the light emitting component is unstable, the display picture flickers and the display effect of the display device is poor. In the present application, the second control chip obtains the result clock signal based on the conversion clock signal and the frame synchronization signal of the first control chip, and the period of the result clock signal and that of the frame synchronization signal meet the preset condition. When the third control chip lights the light emitting component based on the result clock signal and the result display signal, the light emitting component emits light stably, the display picture does not flicker and the display effect of the display device is better. Therefore, the technical problem of poor display effect of the display device is solved by the driving method of the display device of the present application.

Figure 4:
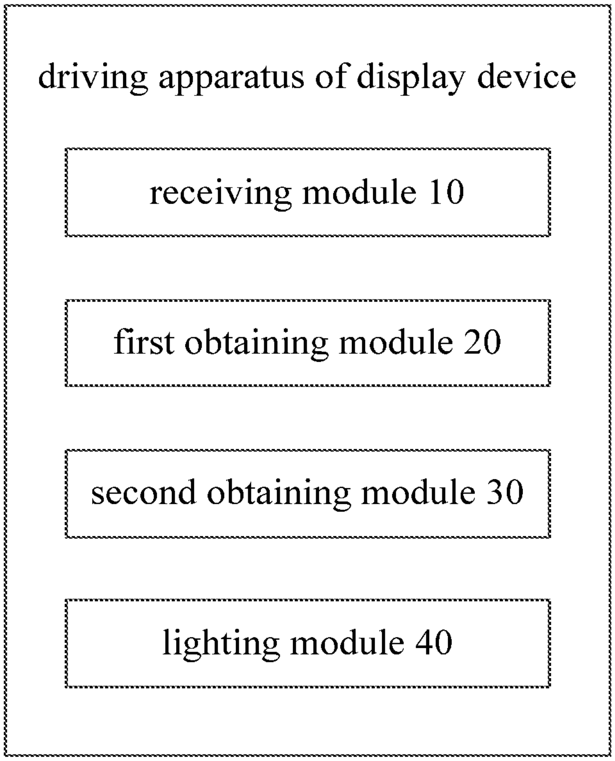
FIG. 4 is a block diagram of a first embodiment of a driving apparatus according to the present application.

Referring to FIG. 4, FIG. 4 is a block diagram of a first embodiment of a driving apparatus of a display device of the present application, and the apparatus is applied to the display device. The display device includes a first control chip, a second control chip, a third control chip and a light emitting component. The apparatus includes:

- a receiving module 10 for receiving and processing target display data to obtain a conversion clock signal, a frame synchronization signal and a pre-processed display signal;
- a first obtaining module 20 for obtaining a result clock signal based on the conversion clock signal and the frame synchronization signal, a period of the result clock signal and that of the frame synchronization signal meeting a preset condition;
- a second obtaining module 30 for obtaining a result display signal based on the pre-processed display signal; and
- a lighting module 40 for lighting the light emitting component based on the result clock signal and the result display signal.

The above mentioned is only optional embodiments of the present application, and is not to limit the claimed scope of the present application. Any equivalent structural transformation made under the concept of the present application, based on the specification and the attached drawings of the present application, or any direct/indirect application in other related technical fields are included in the claimed scope of the present application.

What is claimed is:

1. A driving method of a display device, the display device comprising a first control chip, a second control chip, a third control chip and a light emitting component, the method comprising:

- receiving, by the first control chip, target display data, and processing, by the first control chip, the target display data to obtain a conversion clock signal, a frame synchronization signal and a pre-processed display signal;
- obtaining, by the second control chip, a preset clock signal based on the frame synchronization signal;
- wherein the preset clock signal comprises a plurality of sub-preset clock signals with equal periods and the conversion clock signal comprises a plurality of sub-conversion clock signals with equal periods;
- obtaining, by the second control chip according to a formula I, an adjustment period based on periods of the sub-conversion clock signals, a preset multiplication frequency and a preset division frequency of the second control chip;
- wherein the formula I is:

$$T_{GCLK} = T_{CPV} \times \frac{A}{B}$$

- wherein $T_{GCLK}$ is the adjustment period, $T_{CPV}$ is the periods of the sub-conversion clock signals, A is the preset multiplication frequency and B is the preset division frequency;
- obtaining, by the second control chip, a result clock signal by replacing the periods of the sub-preset clock signals with the adjustment period, wherein a period of the result clock signal and a period of the frame synchronization signal meet a preset condition;
- obtaining, by the second control chip, a result display signal based on the pre-processed display signal; and
- lighting, by the third control chip, the light emitting component based on the result clock signal and the result display signal.

2. The driving method of the display device according to claim 1, wherein the first control chip is a logic board, the second control chip is a microcontroller, and the third control chip is a driver chip for driving light emitting diodes.

3. The driving method of the display device according to claim 2, wherein the light emitting component is a light emitting diode.

4. The driving method of the display device according to claim 1, wherein the result clock signal comprises a plurality of sub-result clock signals with equal periods, and the period of the result clock signal is a sum of the periods of the plurality of sub-result clock signals.

5. The driving method of the display device according to claim 1, wherein the preset condition is that a ratio of the period of the result clock signal to the period of the frame synchronization signal is within a preset interval, and the period of the result clock signal is not greater than the period of the frame synchronization signal.

6. The driving method of the display device according to claim 5, wherein the ratio of the period of the result clock signal to the period of the frame synchronization signal is greater than 0.7 and less than 1.

7. The driving method of the display device according to claim 1, wherein the first control chip receives the target display data from a system control chip, the target display data is processed by the first control chip to obtain the conversion clock signal, the frame synchronization signal and the pre-processed display signal.

8. The driving method of the display device according to claim 1, wherein the conversion clock signal comprises a plurality of sub-conversion clock signals with equal periods, wherein the period of the conversion clock signal is a sum of the periods of the plurality of the sub-conversion clock signals.

9. A display device, comprising: a memory, a processor and a driving program of the display device stored on the memory and operated on the processor, when the driving program of the display device is executed by the processor, the driving method of the display device according to claim 1 is realized.

10. A non-transitory computer readable storage medium storing a driving program of a display device, when the driving program of the display device is executed by a processor, the driving method of the display device according to claim 1 is realized.

* * * * *